United States Patent
Huppenthal et al.

[15] 3,707,102
[45] Dec. 26, 1972

[54] FILM PERFORATING APPARATUS

[72] Inventors: George Alfred Huppenthal, Neenah, Wis.; Shlomo Peeri, Holon, Israel

[73] Assignee: American Can Company, New York, N.Y.

[22] Filed: July 21, 1970

[21] Appl. No.: 56,837

[52] U.S. Cl. .....................83/171, 264/154, 83/170
[51] Int. Cl. .................................................B26f 3/08
[58] Field of Search..................83/16, 170, 171, 660; 264/DIG. 70, 154; 18/19 P, 19 R

[56] References Cited

UNITED STATES PATENTS

| | | | |
|---|---|---|---|
| 3,355,974 | 12/1967 | Carmichael | 83/171 |
| 3,243,488 | 3/1966 | Hannaver, Jr. et al. | 83/16 X |

FOREIGN PATENTS OR APPLICATIONS

| | | | |
|---|---|---|---|
| 553,342 | 12/1956 | Italy | 264/154 |

*Primary Examiner*—James M. Meister
*Attorney*—Robert P. Auber, George P. Ziehmer, Leonard R. Kohan, Ronald A. Schapira and Harries A. Mumma, Jr.

[57] ABSTRACT

The perforating apparatus disclosed includes a perforating roll which has a plurality of apertures in the shape of the perforations to be made in the film. Heated needles are positioned in each of the apertures and the surface surrounding the apertures is cooled below the melting point of the film. A pair of supplementary rolls position the film over the perforating roll so that the film is wrapped almost a full 360° as it is passed over the roll in the perforating process.

8 Claims, 2 Drawing Figures

FILM PERFORATING APPARATUS

BACKGROUND OF THE INVENTION

The present invention relates to apparatus for perforating plastic film by means of heated needles.

Polyethylene and other plastic films have been widely used to package food for complete visual display on grocery counters. Often it is necessary to perforate the film used in packaging to allow air to enter and to control the moisture content in the package so that the food does not become stale or rotten prematurely.

One common method for perforating plastic film involves the use of a simple mechanical punch. Generally, this method has been found deficient because the punched holes easily develop tears that reduce the durability and strength of the completed package. In addition, the punched out portions occasionally remain attached to the edges of the perforations. This residue subsequently may be detached and become mixed with the packaged food.

Another general method, which is the subject of the present invention, uses heated needles to burn or melt a hole in the film. The perforations made by the needles have reinforced edges in the form of grommets that result from the melting of the film as the hot needles form the holes. As a result, the film is not easily torn in the area of the perforations. Another advantage is that, since the hole is burned or melted through the film, there is no punched residue similar to that which results in a mechanical punching operation.

The major problems associated with the use of heated needles are that it is difficult to regulate the size and shape of the resulting holes, and that the perforating apparatus must generally run relatively slowly so that the heated needles will have sufficient time to burn or melt the desired hole in the film.

Accordingly, it is the object of the present invention to provide a film perforating apparatus using heated needles that is capable of generating holes of a controlled size and shape and is capable of operation at relatively high speeds.

SUMMARY OF THE INVENTION

The perforating apparatus of the present invention includes a perforating roll which has a plurality of apertures in the shape of the perforations to be made in the plastic film. Needles, positioned in each of the apertures, are heated by means of an electric current. The surface of the roll surrounding the apertures is cooled by water or other coolant circulating in the wall of the roll. In accordance with the invention the heated needles may either project through the surface of the roll or remain below the surface within each of the apertures.

In operation, the film is passed over the surface of the roll and is perforated by the heated needles. A pair of supplementary rolls with smaller diameters than the perforating roll are positioned to hold the film in place around the perforating roll. The two supplementary rolls insure that the film is wrapped around the perforating roll a maximum amount, almost a full 360°, as the film is fed over the perforating roll. The heat from the needles in the perforating roll melts the film and causes a bead-like grommet to be formed around the hole for resistance to tearing. Since the cooled surface of the roll solidifies the melting film surrounding the needles, the shape of the perforations is closely regulated by the shape of the apertures in the roll. In addition, the size of the perforations is determined by the positioning of the heated needles relative to the surface of the roll. In a preferred embodiment, the needles have a conically shaped nose that projects above the surface of the roll. The cross-sectional diameter of the nose at the surface of the roll increases as the nose projects further above the surface so that the size of the perforation is affected by the relative positioning of the needles with respect to the surface.

In the past, the use of heated needles to perforate plastic films has been limited by the slow speed of the perforating apparatus. This slow speed, in part, results from the fact that these prior devices use separate rolls to carry the needles and to support the film to be perforated. Since the roll with the needles rotates about a different axis from the axis of the roll supporting the film, the length of the arc reflecting the path of continued contact between the needles and the film is limited generally to angles of less than 180°. A short arc of contact indicates that the film is in contact with each needle a relatively short time in each cycle of the rolls. Since the needles must be in contact with the film for a predetermined minimum time to form proper perforations, a limited arc of contact limits the speed of rotation of the rolls and thereby limits the speed of the entire perforating process.

The advantage of the present perforating apparatus is that the film is passed over a single perforating roll which has the heated needles integrated in well defined apertures. Since the heated needles cover the entire 360° surface of the perforating roll and since the film is passed directly over the roll, the film may be positioned for maximum contact with the needles as the film is passed through the perforating process. As a result of the great arc of contact between the film and the heated needles, the film remains in contact with the needles for a relatively long period and may be passed over the perforating roll at relatively high speeds without affecting the uniformity of the hole size. In addition, the chilled surface closely surrounding the heated needles permits close regulation of the size and shape of the holes and grommets as the film is passed over the roll.

DETAILED DESCRIPTION

Figure 1:
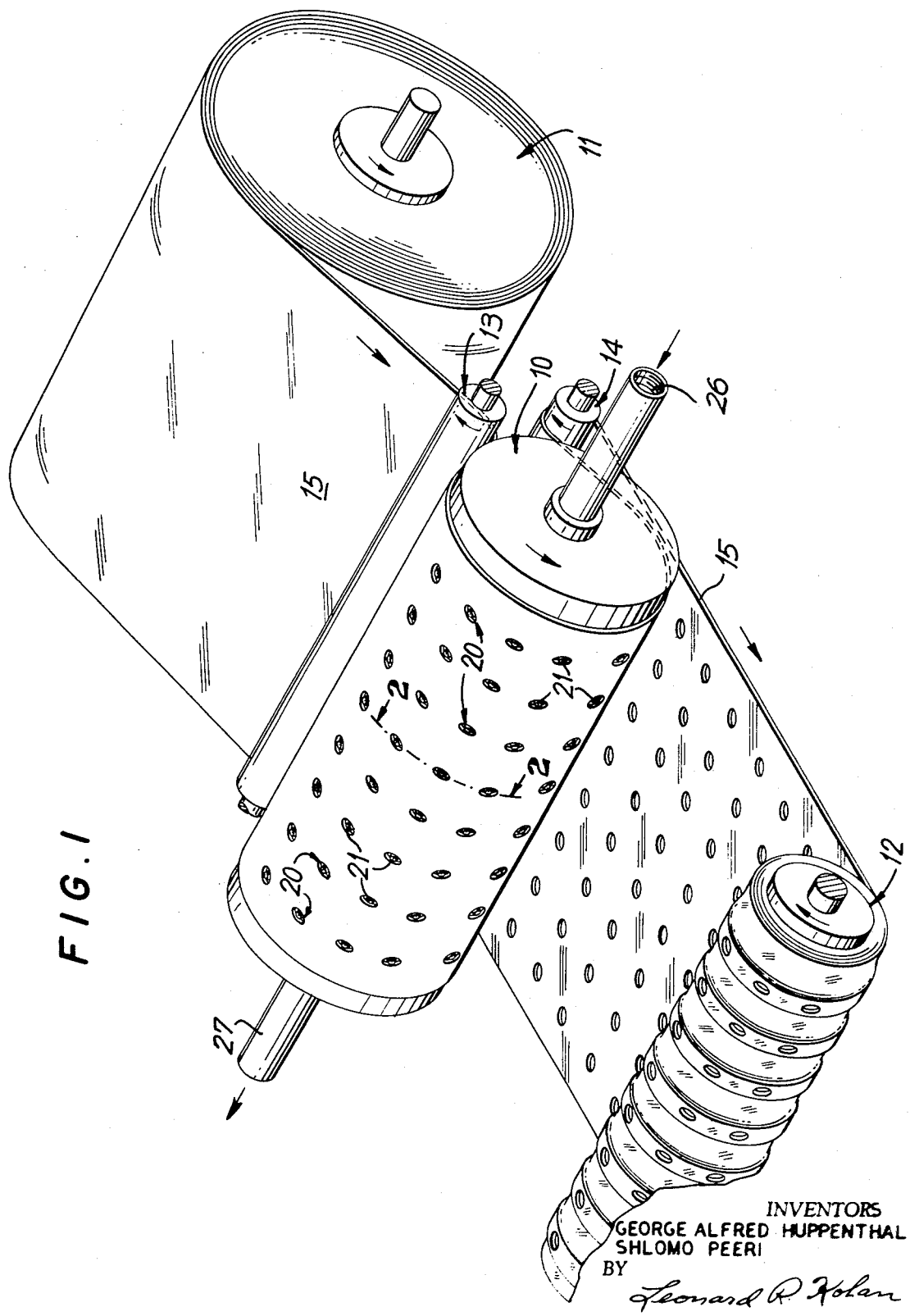
FIG. 1 is a perspective view of the film perforating apparatus of the present invention.

The perforating apparatus shown in FIG. 1 includes a perforating roll 10, film supply roll 11 and a perforated film take up roll 12. Two supplementary rolls 13 and 14 are positioned adjacent to one another and adjacent to the perforating roll 10. In the illustrative embodiment shown in FIG. 1 the film 15 to be perforated is positioned under the supplementary roll 14 and then continues to the take up roll 12. The film 15 may be any of a number of plastic films, including such films as polyethylene, polypropylene and Nylon Maraflex.

The purpose of supplementary rolls 13 and 14 is to wrap the film 15 about the perforating roll 10 so that a contact surface of almost 360° is provided with roll 10 before the film is passed to take up roll 12. Rolls 10, 11 and 12 rotate about fixed axes. In addition, to insure proper tightening of film 15 about roll 10, supplementary roll 14 is preferably a conventional dancer roll suitably arranged to control a magnetic or similar braking device operating on supply roll 11, whereby the tension of the web is properly controlled.

As shown for purposes of illustration, when the perforating roll 10 rotates in a counterclockwise direction, the film supply roll 11 also rotates in a counterclockwise direction and the supplementary roll 13 rotates in a clockwise direction. The film 15 continues around the roll 10 and causes the supplementary roll 14 to rotate in a clockwise direction. The take up roll 12 rotates in a clockwise direction to rewind the perforated film after it leaves the supplementary roll 14. Perforating roll 10 and take up roll 12 may be powered by any of a number of conventional means. Roll 12 may be axially oscillated slightly to prevent any irregularities from developing in the roll of film as it is wound up on the take up roll 12, thus avoiding lumpiness of the film roll due to the greater thickness of the grommet areas.

Figure 2:
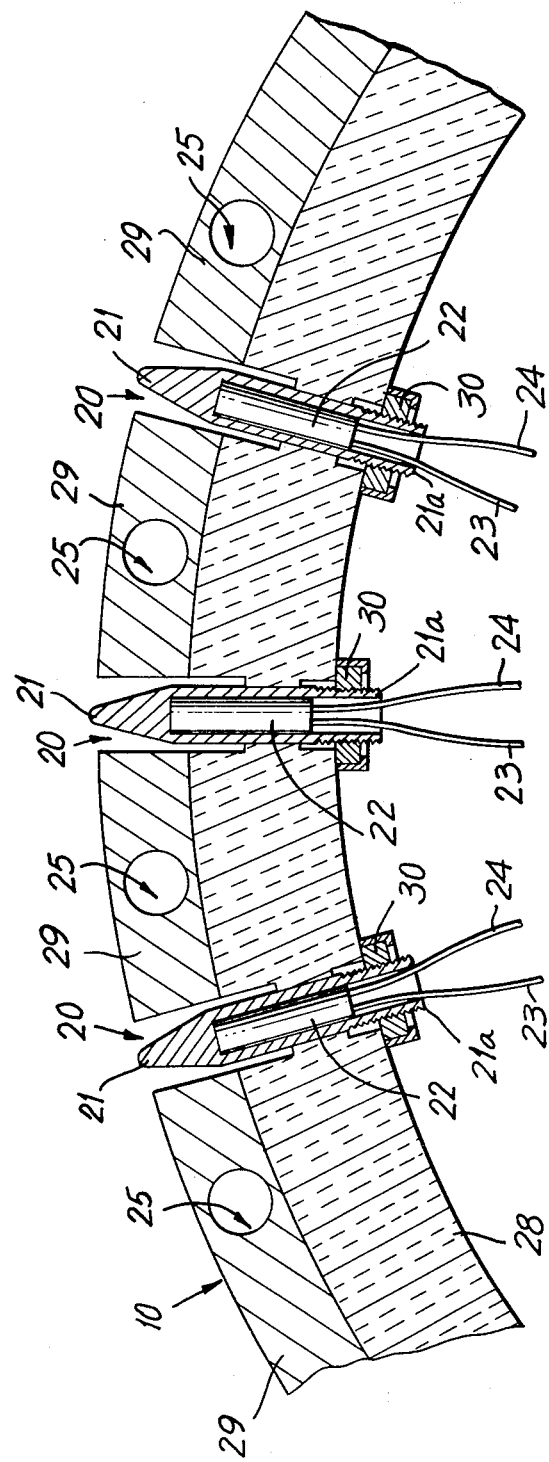
FIG. 2 is a partial sectional view taken along the line 2—2 of FIG. 1.

As shown in FIG. 2, the perforating roll 10 has a series of apertures 20 in which are positioned heated needles 21. Each of the needles 21 contains a heating element 22 embedded in a conically shaped nose. An electric current passing through wire pairs 23 and 24 heats the elements 22 so that the needles will form perforations in the film 15. The apertures 20 and needles 21 may be arranged in any desired format in the roll 10. For illustrative purposes, the apertures and needles in FIG. 1 are positioned uniformly throughout the cylindrical surface of the roll 10 to form evenly spaced columns and rows of perforations in the film 15.

Perforating roll 10 is divided into an inner layer 28 of insulating material and a surface layer 29 which cools the surface of the roll surrounding the apertures 20. The surface layer 29 is chilled by means of a coolant that flows through passages 25 formed in the layer 29, as shown in the sectional view of FIG. 2. The insulating effect of the inner layer 28 isolates the layer 29 from the heat of needles 21 and increases the effectiveness of the coolant in passages 25. In the preferred embodiment, the needles 21 are mounted on to the inner layer and do not contact the surface layer 29 so that a minimum amount of heat is transferred from the needles 21 to the chilled surface layer 29. The inner layer 28 may be any of a number of conventional insulating materials such as Transite or Marinite. In contrast, the outer layer 29 is a heat conducting material which maintains the chilled surface provided by the coolant in passages 25.

Electric current may be supplied to each of the wire pairs 23 and 24 in the roll 10 from an external power source by any of a variety of conventional methods. One method is to connect the powering apparatus to the roll 10 by means of conventional electrical brushes (not shown) such as are used in generators and electric motors so that the heating elements 22 may be powered by the external source while the roll 10 is rotating. Each of the wire pairs 23 and 24 may be connected individually to the brushes, or the roll 10 may be supplied with an inner conducting ring (not shown) connected between the brushes and the wire pairs 23 and 24.

In FIG. 2 the nose of each of the needles 21 projects slightly above the level of the surface of roll 10. The needles may be mounted in the roll 10 at fixed levels, such as at the level shown in FIG. 2, or they may be mounted adjustably in order to permit easy variation in the height of the needles relative to the surface of the roll. One simple means for adjustably mounting the needles is to thread the base of the needle, such as shown by 21 (a). In such a case, an adjusting and locking nut 30 is mounted rotatably on the inside of the roll so that rotation of the nut adjusts the level of the needle.

At a constant speed of rotation of the perforating roll and at a constant temperature of the needles, the amount of the projection of the nose of each needle 21 above the surface of roll 10 controls the size of the perforations made by the roll 10. If, for example, the nose of the needles 21 in FIG. 2 is raised relative to the level of the surface of the roll 10, the resulting cross-sectional diameter of the needle 21 that intersects with the film 15 at the surface of the roll is increased so that a larger hole is melted in the film. Correspondingly, if the needle 21 is moved lower with respect to the surface of the roll 10, a smaller hole is produced in the film 15.

It should be noted, however, that the general shape of the resulting perforation is determined by the shape of the aperture. It should be also noted that if the nose of the needle 21 remains below the surface of the roll 10, so that there is no initial contact of the needle 21 with the film 15, the heat radiated by the nose still causes the film 15 to melt, thereby forming a small perforation in the shape determined by the shape of the aperture in the surface of the roll 10.

Any smoke that results from the melting or burning of the film 15 as it passes over the perforating roll 10 may be removed by conventional exhaust removal apparatus. When it is desirable to eliminate any possibility of burning of the film 15, the entire perforating apparatus may be enclosed in an inert atmosphere, such as nitrogen.

In conclusion, therefore, it may be seen that the above-described perforating apparatus provides an economical and flexible system that may be used for perforating a variety of types of plastic films. The general shape of the perforations may be controlled by controlling the shape of the apertures in the perforating roll. Variations in the thickness of the film may be accounted for by adjusting the height of the needle nose relative to the surface of the roll 10. The general shape of the perforations may also be varied by providing means for varying the size of the apertures as by the use of threaded female apertures in the roll and interchangeable threaded male aperture inserts. The apparatus may, in addition, be run at a maximum rate of speed because of the large arc of contact of the needles with the film as it is passed over the perforating roll. It may be readily appreciated that the film 15 has a maximum contact with the roll 10 and the needles 21 so that the needles remain in contact with the film for a maximum amount of time. Thus, the above-described system provides for reinforced perforations which are resistent to tearing and which may be produced economically at rapid rates of speed.

What is claimed is:

1. Apparatus for perforating a plastic film comprising:

a perforating roll supported for rotation, the outer surface of said roll having a plurality of apertures;

a plurality of needles mounted to said roll and positioned in said apertures;

means for heating said needles;

means for cooling the surface of said roll around said apertures;

means for feeding said film to said roll;

means for removing said film from said roll; and means for positioning said film around the surface of said roll so that said heated needles form perforations in said film as said roll is rotated.

2. Apparatus in accordance with claim 1 wherein said means for positioning said film includes first and second supplementary rollers positioned adjacent each other and adjacent said perforating roll so that said film makes contact with a majority of the surface area of said perforating roll.

3. Apparatus in accordance with claim 1 wherein each of said needles has a conically shaped nose projecting above the surface of said roll through said apertures.

4. Apparatus in accordance with claim 1 wherein said needles are positioned adjustably in said apertures.

5. Apparatus in accordance with claim 4 wherein said perforating roll is provided with means for varying the area of each of said apertures.

6. Apparatus for perforating a plastic film comprising:

a perforating roll rotating about a fixed axis, the outer surface of said roll having a plurality of apertures of a predetermined shape;

a plurality of needles mounted to said roll and positioned in said apertures, the cross-sectional size and shape of said needle at the surface of said roll closely matching the size and shape of said apertures;

means for heating said needles;

coolant passages in said roll and close to said surface, through which passages a coolant flows;

recirculating means for continually supplying the coolant to said passages to chill the surface of said roll;

means for feeding said film to said roll;

means for removing said film from said roll; and means adjacent said roll for tensioning said film around said surface of said roll such that the majority of said surface area is contacted by said film as said roll is rotated.

7. Apparatus in accordance with claim 5 wherein said means for positioning said film around said roll includes first and second supplementary rollers positioned adjacent each other, said film passing around said perforating roll and between said rollers.

8. Apparatus in accordance with claim 5 wherein said perforating roll has a heat conducting surface layer surrounding said passages and a heat insulating inner layer to insulate said surface layer from the heat of said needles inside said roll.

* * * * *